US010353390B2

(12) United States Patent
Linscott et al.

(10) Patent No.: US 10,353,390 B2
(45) Date of Patent: Jul. 16, 2019

(54) TRAJECTORY GENERATION AND EXECUTION ARCHITECTURE

(71) Applicant: Zoox, Inc., Menlo Park, CA (US)

(72) Inventors: Gary Linscott, Cupertino, CA (US); Robert Edward Somers, Sunnyvale, CA (US); Joona Markus Petteri Kiiski, Cupertino, CA (US); Marin Kobilarov, Mountain View, CA (US); Timothy Caldwell, Mountain View, CA (US); Jacob Lee Askeland, San Jose, CA (US); Ashutosh Gajanan Rege, San Jose, CA (US); Joseph Funke, Redwood City, CA (US)

(73) Assignee: Zoox, Inc., Foster City, CA (US)

(*) Notice: Subject to any disclaimer, the term of this patent is extended or adjusted under 35 U.S.C. 154(b) by 188 days.

(21) Appl. No.: 15/632,208

(22) Filed: Jun. 23, 2017

(65) Prior Publication Data

US 2018/0251126 A1    Sep. 6, 2018

Related U.S. Application Data

(60) Provisional application No. 62/465,724, filed on Mar. 1, 2017.

(51) Int. Cl.
*B60W 30/09* (2012.01)
*G05D 1/02* (2006.01)
(Continued)

(52) U.S. Cl.
CPC ........... *G05D 1/0088* (2013.01); *B60W 30/09* (2013.01); *G01C 21/3407* (2013.01);
(Continued)

(58) Field of Classification Search
CPC .. G05D 1/0088; G05D 1/0055; G05D 1/0274; G05D 1/0212; G05D 1/0272;
(Continued)

(56) References Cited

U.S. PATENT DOCUMENTS 5,177,685 A * 1/1993 Davis .................. B60R 16/0373
340/988
6,707,421 B1 * 3/2004 Drury ................. G01C 21/3415
342/357.31
(Continued)

FOREIGN PATENT DOCUMENTS

WO    WO2016130719    8/2016

OTHER PUBLICATIONS

U.S. Appl. No. 15/632,208, filed Jun. 23, 2017, Linscott, et al., "Trajectory Generation and Execution Architecture", 63 pages.
(Continued)

*Primary Examiner* — Nga X Nguyen
(74) *Attorney, Agent, or Firm* — Lee & Hayes, P.C.

(57) ABSTRACT

Techniques for generating and executing trajectories to guide autonomous vehicles are described. In an example, a first computer system associated with an autonomous vehicle can generate, at a first operational frequency, a route to guide the autonomous vehicle from a current location to a target location. The first computer system can further determine, at a second operational frequency, an instruction for guiding the autonomous vehicle along the route and can generate, at a third operational frequency, a trajectory based at least partly on the instruction and real-time processed sensor data. A second computer system that is associated with the autonomous vehicle and is in communication with the first computer system can execute, at a fourth operational frequency, the trajectory to cause the autonomous vehicle to travel along the route. The separation of the first computer
(Continued)

system and the second computer system can provide enhanced safety, redundancy, and optimization.

20 Claims, 6 Drawing Sheets

(51) Int. Cl.
    *G05D 1/00*     (2006.01)
    *G01C 21/34*     (2006.01)
    *G06N 3/04*     (2006.01)
    *G06N 3/08*     (2006.01)

(52) U.S. Cl.
    CPC ......... *G05D 1/0055* (2013.01); *G05D 1/0212* (2013.01); *G05D 1/0223* (2013.01); *G05D 1/0272* (2013.01); *G05D 1/0274* (2013.01); *G06N 3/04* (2013.01); *G06N 3/08* (2013.01); *G05D 2201/0213* (2013.01)

(58) Field of Classification Search
    CPC ......... G05D 1/0223; G05D 2201/0213; G06N 3/04; G06N 3/08; G01C 21/3407; B60W 30/09
    See application file for complete search history.

(56) References Cited

U.S. PATENT DOCUMENTS

| | | | |
|---|---|---|---|
| 8,112,225 B2 | 2/2012 | Eidehall et al. | |
| 8,121,749 B1 | 2/2012 | Agrawal et al. | |
| 8,473,447 B2 | 6/2013 | Yoon et al. | |
| 8,645,310 B2 | 2/2014 | Jiang et al. | |
| 8,880,272 B1 | 11/2014 | Ferguson et al. | |
| 9,558,659 B1 | 1/2017 | Silver et al. | |
| 9,568,915 B1 | 2/2017 | Berntorp et al. | |
| 9,612,123 B1 | 4/2017 | Levinson et al. | |
| 2003/0187578 A1 | 10/2003 | Nishira et al. | |
| 2005/0049785 A1 | 3/2005 | Vergin | |
| 2011/0125344 A1* | 5/2011 | An ........................ G05D 1/0242 701/2 |
| 2011/0205042 A1 | 8/2011 | Takemura et al. | |
| 2014/0324268 A1 | 10/2014 | Montemerlo et al. | |
| 2017/0031361 A1 | 2/2017 | Olson et al. | |
| 2017/0277195 A1 | 9/2017 | Frazzoli et al. | |

OTHER PUBLICATIONS

Office Action for U.S. Appl. No. 15/632,147, dated Apr. 30, 2018, Kobilarov et al., "Trajectory Generation Using Temporal Logic and Tree Search", 6 pages.
PCT Invitation to Pay Additional Fees dated Jun. 6, 2018 for PCT application No. PCT/US2018/019685, 12 pages.
PCT Search Report and Written Opinion dated Jul. 30, 2018, for PCT Application No. PCT/US18/19685, 17 pages.
Broadhurst et al., "Monte Carlo Road Safety Reasoning", Proc IEEE Intelligent Vehicles Symposium, Jun. 2005, 6 pgs.
Gu et al, "On-Road Motion Planning for Autonomous Vehicles", Proc 5th intl conf on Intelligent Robotics and Applications, vol. Part III, ICIRA Oct. 2012, 10 pgs.
McMahon et al., "Sampling-Based Tree Search with Discrete Abstractions for Motion Planning with Dynamics and Temporal Logic", IEEE/RSJ Intl Conf on Intelligent Robots and Systems, Sep. 2014, 9 pgs.
Wongpiromsam et al., "Receding Horizon Temporal Logic Planning", IEEE Transactions on Automatic Control, vol. 57, Issue 11, Nov. 2012, 14 pgs.
The PCT Search Report and Written Opinion dated Apr. 15, 2019, for PCT Application No. PCT/US2019/016407, 11 pages.

* cited by examiner

TRAJECTORY GENERATION AND EXECUTION ARCHITECTURE

CROSS REFERENCE TO RELATED APPLICATIONS

This patent application claims priority filing benefit from U.S. Provisional Patent Application No. 62/465,724, filed Mar. 1, 2017, which is hereby incorporated by reference, in its entirety.

BACKGROUND

Various methods, apparatuses, and systems are utilized by autonomous vehicles to guide such autonomous vehicles through environments including various static and/or dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, the behavior of other objects in an environment and road conditions can be unpredictable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes methods, apparatuses, and systems for generating and executing trajectories to control autonomous vehicles. In at least one example, this disclosure describes an architecture for generating and executing trajectories to control autonomous vehicles. The architecture can include various layers that operate at different frequencies. Additionally, the architecture can include computer system(s) configured to generate and refine a trajectory, and a separate and distinct vehicle control device configured to execute the trajectory. Such separation can provide enhanced safety, redundancy, and optimization, as described herein. Additionally, such separation can be useful for troubleshooting problems associated with individual components of the architecture. Furthermore, such separation can be useful for obtaining safety certification(s) for components of the architecture.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems requiring autonomous or semi-autonomous control, such as industrial robots or unmanned aerial vehicles. For example, the methods, apparatuses, and systems can be utilized in a manufacturing assembly line context, in an aerial surveying context, etc. Additionally, the techniques described herein can be used with real data (e.g., captured using sensor(s)), simulated data (e.g., generated by a simulator), or any combination of the two.

Figure 1:
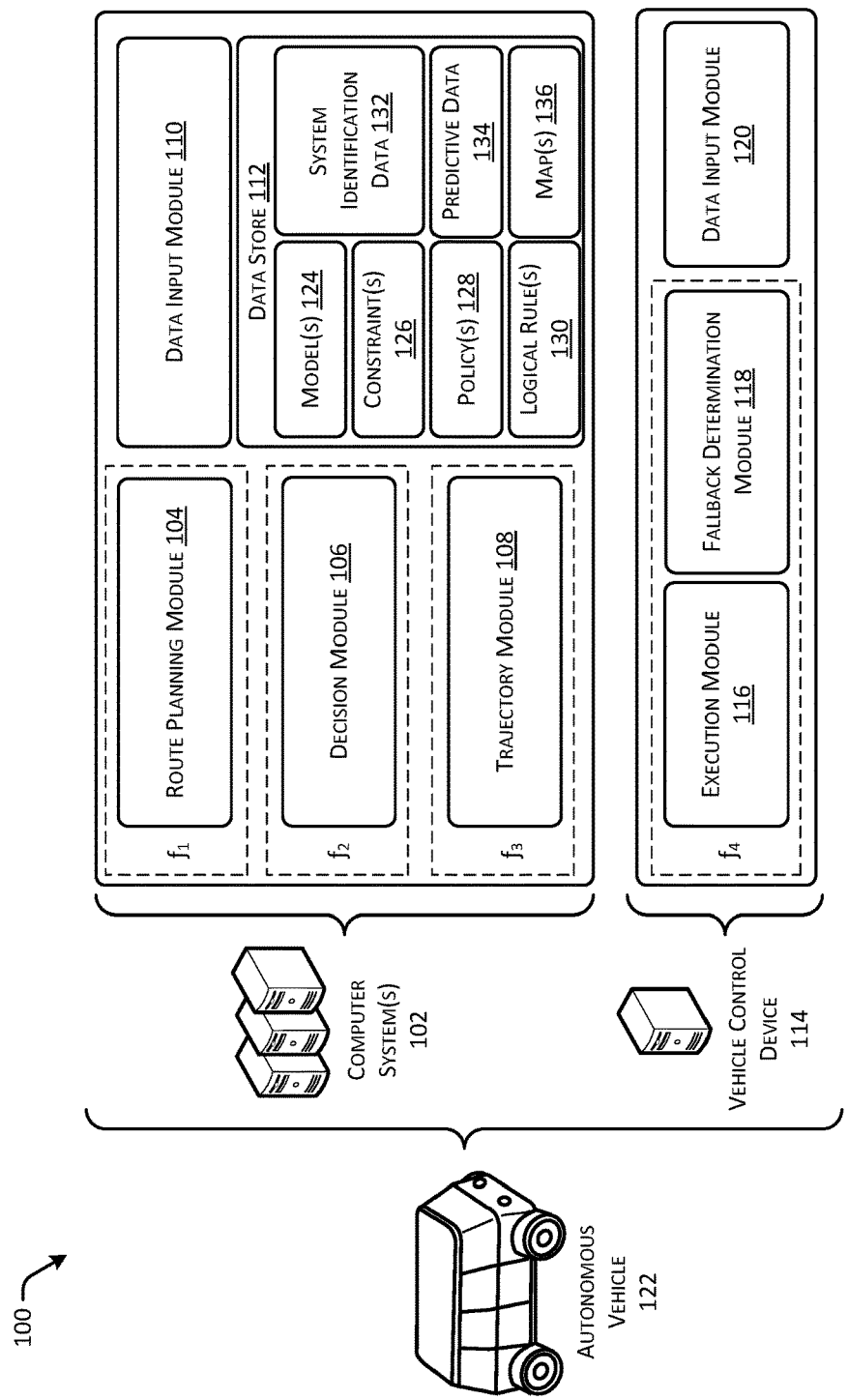
FIG. 1 illustrates an example architecture for generating and executing trajectories to control autonomous vehicles, as described herein.

FIG. 1 illustrates an example architecture 100 for generating and executing trajectories to control autonomous vehicles, as described herein. For example, the architecture 100 can include computer system(s) 102 including various hardware and/or software to implement aspects of the systems, methods, and apparatuses described herein. For example, the computer system(s) 102 can include a route planning module 104, a decision module 106, a trajectory module 108, a data input module 110, and a data store 112. Additionally, the architecture 100 can include a vehicle control device 114 including various hardware and/or software to implement aspects of the systems, methods, and apparatuses described herein. In some examples, the vehicle control device 114 can be a separate and distinct computer system, which can include an execution module 116, a fallback determination module 118, and a data input module 120. In some examples, the computer system 102 may comprise the vehicle control device 114.

In some examples, the computer system(s) 102 and vehicle control device 114 can be embodied in an autonomous vehicle 122, or any other type of transportable computer system. In other examples, the computer system(s) 102 can be remotely located from the autonomous vehicle 122 and the vehicle control device 114 can be embodied in the autonomous vehicle 122. In some instances, the computer system(s) 102 can provide planning functionality for the autonomous vehicle 122 and the vehicle control device 114 can provide execution functionality for the autonomous vehicle 122, as described herein.

As described above, the computer system(s) 102 can include a route planning module 104, a decision module 106, a trajectory module 108, a data input module 110, and a data store 112. In at least one example, individual modules of the modules (e.g., the route planning module 104, the decision module 106, and the trajectory module 108) can have different frequencies of operation. As illustrated in FIG. 1, the route planning module 104 can have a first frequency of operation (e.g., $f_1$), the decision module 106 can have a second frequency of operation (e.g., $f_2$), and the trajectory module 108 can have a third frequency of operation (e.g., $f_3$). In at least one example, the first frequency can be the lowest frequency (e.g., 10 Hertz) and the third frequency can be the highest frequency (e.g., 100 Hertz). That is, in at least one example, the route planning module 104 can process data at a lower speed than the decision module 106, which can process data at a lower speed than the trajectory module 108. The different frequencies can enable the architecture 100 to distribute computational resources to modules based on a frequency in which individual modules receive updated data and/or a time period in which individual modules need to process and output data.

The route planning module 104 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planning module 104 can perform a search, such as a graph search, on top of a map to identify a route to guide the autonomous vehicle 122 from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planning module 104 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planning module 104 can identify two or more candidate routes for guiding the autonomous vehicle 122 from the first location to the second location. In such examples, the route planning module 104 can rank the two or more candidate routes based on route planning constraint(s). Route planning constraint(s) can include rules of the road, travel time, travel distance, etc. In at least one example, the route planning module 104 can determine that a top-ranking candidate route is the route for guiding the autonomous vehicle 122 from the first location to the second location. The route planning module 104 can output a sequence of waypoints corresponding to the route to the decision module 106.

In at least one example, the decision module 106 can receive the route (e.g., the sequence of waypoints) and can generate an instruction for guiding the autonomous vehicle 122 along at least a portion of the route from the first location to the second location. In at least one example, the decision module 106 can determine how to guide the autonomous vehicle 122 from a first waypoint in the sequence of waypoints to a second waypoint in the sequence of waypoints. In some examples, the instruction can be a trajectory, or a portion of a trajectory. In such examples, the decision module 106 can generate a sequence of actions (e.g., drive down the road, accelerate, change lanes, turn left, etc.) to guide the autonomous vehicle 122 along the route. A non-limiting example of a trajectory can be "drive the autonomous vehicle at 10 meters/second." In other examples, the instruction can be a policy. A policy can be used to determine a trajectory of the autonomous vehicle 122 based on real-time processed sensor data received from sensor(s) on the autonomous vehicle 122. A non-limiting example of a policy can be "follow the car in front by κ meters."

In at least one example, the decision module 106 can utilize one or more models and/or algorithms to determine an instruction for guiding the autonomous vehicle 122 from the first location to the second location in view of constraint(s). For instance, in at least one example, the decision module 106 can utilize a combination of temporal logic (e.g., linear temporal logic (LTL), signal temporal logic (STL), interval temporal logic (ITL), computational tree logic (CTL) property specification language (PSL), Hennessy-Milner logic (HML), etc.) and a search algorithm (e.g., policy tree search, Monte Carlo Tree Search (MCTS), exhaustive search, etc.) to determine one or more candidate instructions and evaluate a performance of each of the potential instructions prior to determining which instruction to select. Additional details associated with the decision module 106 are described in related application Ser. No. 15/632,147, which is incorporated by reference herein, in its entirety. The decision module 106 can output the instruction to the trajectory module 108.

In at least one example, the decision module 106 can determine a fallback instruction. The fallback instruction can be an instruction that the autonomous vehicle 122 is to follow when an event warranting a fallback action, described below, occurs. In such an example, the decision module 106 can provide the fallback instruction to the trajectory module 108 and/or the fallback determination module 118. In some examples, the decision module 106 can provide a fallback instruction to the trajectory module 108 and/or the fallback determination module 118 at the same time that the decision module 106 provides an instruction to the trajectory module 108 (i.e., the decision module 106 can provide two instructions to the trajectory module 108). In other examples, the decision module 106 can provide a fallback instruction to the trajectory module 108 and/or the fallback determination module 118 at different times than when the decision module 106 provides an instruction to the trajectory module 108.

In some examples, the decision module 106 can have a limited amount of time to output an instruction. That is, in at least one example, the decision module 106 can receive an interrupt requesting an instruction and the decision module 106 can provide an instruction responsive to receiving the interrupt. Furthermore, processing the route to generate an instruction can be computationally expensive. Accordingly, in at least one example, the decision module 106 can operate at a higher frequency than the route planning module 104, as described above. In at least one example, the decision module 106 can operate at a frequency that is lower than the frequency required for real-time decision making performed by the trajectory module 108. As a non-limiting example, the decision module 106 can operate at 10 Hertz, whereas the route planning module 104 can operate at one Hertz and the trajectory module 108 can operate at 30 Hertz.

The trajectory module 108 can receive the instruction and can optimize the instruction based on objects identified in the environment. In at least one example, the trajectory module 108 can access, receive, and/or determine real-time processed sensor data to determine object(s) in the environment which the autonomous vehicle 122 is travelling. In the at least one example, the trajectory module 108 can process the instruction in view of the real-time processed sensor data.

In an example where the instruction is a trajectory, the trajectory module 108 can leverage model(s) and/or algorithm(s), constraint(s), and/or cost(s) to optimize the trajectory. For instance, the trajectory module 108 can utilize model(s) and/or algorithm(s) including, but not limited to, differential dynamic programming, interior point optimization, sequential quadratic programming, etc. to refine the trajectory. In at least one example, the constraint(s) can include, but are not limited to, cost(s), comfort, safety, rules of the road, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle 122 can be optimized to include a positive, a negative, or a zero value. In at least one example, a rotation of the autonomous vehicle 122 can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory module 108 can generate an output trajectory.

In an example where the instruction is a policy, the trajectory module 108 can leverage model(s) and/or algorithm(s), constraint(s), and/or cost(s) to generate a trajectory based on the policy and real-time processed sensor data. For instance, the trajectory module 108 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory module 108 can access, receive, and/or determine real-time processed sensor data. The trajectory module 108 can leverage the real-time processed sensor data to generate an output trajectory. The trajectory module 108 can utilize a more detailed model of the autonomous vehicle 122 than the decision module 106. Processing that utilizes such a detailed model can be computationally expensive. Additionally, the trajectory module 108 can output an output trajectory within a predetermined amount of time after receiving the real-time processed sensor data. For instance, in at least one example, the trajectory module 108 can receive an interrupt requesting an output trajectory and the trajectory module 108 can provide an output trajectory responsive to receiving the interrupt. In some examples, the trajectory module 108 can have less time to output an output trajectory than the decision module 106 has to output a trajectory, in order to account for obstacles (e.g., another vehicle, pedestrian, etc.) or conditions. Accordingly, the trajectory module 108 can operate at a higher frequency than the route planning module 104 and/or the decision module 106, as described above.

In at least one example, the trajectory module 108 can receive a fallback instruction from the decision module 106. In such examples, the trajectory module 108 can generate an output fallback trajectory based on processing the fallback instruction in a substantially similar manner as described above. In some examples, as described above, the trajectory module 108 can output the output trajectory and the output fallback instruction at the same time.

The data input module 110 can receive input from one or more sensors on the autonomous vehicle 122. In at least one example, the autonomous vehicle 122 can have one or more sensors which can include light detection and ranging (LIDAR) sensors for capturing LIDAR data for image segmentation and/or classification, camera sensors for capturing vision data for segmentation and/or classification, radio detection and ranging (RADAR) sensors for capturing range, angle, and/or velocity of objects in an environment, sound navigation and ranging (SONAR) sensors for capturing acoustic information of objects in an environment, etc. In at least one example, the data input module 110 can receive data from each of the sensors (e.g., LIDAR sensors, camera sensors, RADAR sensors, SONAR sensors, etc.) described above and can process the data to identify objects and determine information about the objects in the environment. Additionally, the autonomous vehicle 122 can include ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc. The data input module 110 can process data received from the one or more sensors to determine a state of the autonomous vehicle 122 at a particular time. That is, the data input module 110 can process data received from the one or more sensors to determine a position of the autonomous vehicle 122 at a particular time, an orientation of the autonomous vehicle 122 at a particular time, a velocity of the autonomous vehicle 122 at a particular time, etc. In at least one example, the one or more sensors and the data input module 110 can be associated with a perception system for performing data analysis such as segmentation and classification. As described below, such data (e.g., real-time processed sensor data) can be used by the trajectory module 108 for generating output trajectories. Additionally, such data (e.g., real-time processed sensor data) can be used by the route planning module 104 for planning routes and/or the decision module 106 for generating instructions.

The data store 112 can store data so that it can be organized, updated, and accessed. In at least one example, the data store 112 can include model(s) 124, constraint(s) 126, policy(s) 128, logical rule(s) 130, system identification data 132, predictive data 134, map(s) 136, etc. The model(s) 124 can include model(s) of the autonomous vehicle 122, model(s) of other objects in the environment, decision model(s), etc.

Any number of vehicle models can be used with the systems and methods discussed herein. In some examples, a vehicle model having coarse discretizations of possible actions and/or predicted steering angle can be used. The choice of a particular vehicle model can be made to generate feasible trajectories that could be executed by an autonomous vehicle.

In one example, the state of each road world entity, i, can be defined by $w_i = [p_x, p_y, \theta, v, \psi]$, where $(p_x, p_y)$ are the vehicle's inertial coordinates, $\theta$ its bearing, and $v$ its linear velocity. Further, a road world control input can comprise one or more of an acceleration $a$ and a steering angle rate $\dot{\psi}$, such that $u = [u_1, u_2] := (a, \omega)$, though any number of other control inputs are contemplated.

Continuing in such an example, dynamics of the planning agent (e.g., the autonomous vehicle) can be modeled as:

$$\dot{p}_x = v\cos\theta \tag{1}$$

$$\dot{p}_y = v\sin\theta \tag{2}$$

$$\dot{\theta} = \frac{v}{L}\tan\psi \tag{3}$$

$$\dot{v} = u_1 \tag{4}$$

$$\dot{\psi} = u_2 \tag{5}$$

where L is the vehicle wheelbase length. In some examples, a fixed time step of 0.1 seconds can be used for learning and for all experiments, though any other time step is contemplated. As can be understood, in some examples, dynamics of the autonomous vehicles can be stored as one of the model(s) 124. The constraint(s) 126 can include cost(s), comfort, safety, rules of the road, etc. The policy(s) 128 can include manual policies, learned policies, control policies, option policies, etc. Example policies include, but are not limited to, a minimum distance to maintain from other vehicles, maximum acceleration rates, driving rules (e.g., stay within a lane, don't cross double yellow lines, etc.), and the like. The logical rule(s) 130 can include reasoned rules of the road, etc. The system identification data 132 can include information about the autonomous vehicle 122 over time. The predictive data 134 can include one or more snapshots of the autonomous vehicle 122 at future time(s), and/or can include predictions of behavior of other dynamic objects (e.g., other vehicles) proximate to the autonomous vehicle 122 at future time(s). The map(s) 136 can include data structures modeled in two dimensions or three dimensions that are capable of providing information about an environment, such as, but not limited to, topologies (such as intersections), streets, mountain ranges, roads, terrain, and the environment in general.

As described above, the vehicle control device 114 can be a separate and distinct computer system, which can include an execution module 116, a fallback determination module 118, and a data input module 120. In some examples, the vehicle control device 114 can access the data input module 110 and/or data store 112 associated with the computer system(s) 102.

The execution module 116 can receive the output trajectory from the trajectory module 108 and can compute commands for actuating steering and acceleration of the autonomous vehicle 122 to enable the autonomous vehicle 122 to follow the output trajectory. In at least one example, the execution module 116 can receive the output trajectory and can compute a steering angle and velocity to enable the autonomous vehicle 122 to follow the output trajectory. A non-limiting example of an algorithm that the execution module 116 can use is provided below.

$$\delta = -P * ela \quad (6)$$

$$ela = e + xla * \sin(\Delta\Psi) \quad (7)$$

In equations (6) and (7) above, a gain (e.g., a predetermined constant value) is represented by P, lateral error is represented by e, lookahead error is represented by ela, heading error is represented by $\Delta\Psi$, lookahead distance (parameter) is represented by xla, and steering angle is represented by $\delta$.

The fallback determination module 118 can access, receive, and/or generate fallback trajectory(s). As described above, a fallback trajectory can be a trajectory that the autonomous vehicle 122 is to follow responsive to determining an occurrence of an event warranting a fallback action. In at least one example, an event can be a problem with the computer system(s) 102. For instance, a sensor associated with the computer system(s) 102 can fail or a component of the autonomous vehicle 122 can malfunction (e.g., tire pops, windshield shatters, etc.). Or, an event can be associated with a lack of communication from the computer system(s) 102 and/or responsiveness of the computer system(s) 102. In some examples, an event can be an object that is within a threshold distance of the autonomous vehicle 122, an object that is predicted to be within a threshold distance of the autonomous vehicle 122, or a probability of an accident (i.e., collision) exceeding a threshold probability. Moreover, in at least one example, an event can be associated with an occupancy status of the autonomous vehicle 122. An occupancy status of the autonomous vehicle 122 can indicate when a passenger in the autonomous vehicle 122 becomes incapacitated, when a passenger (or object associated with a passenger) is defenestrated from the autonomous vehicle 122, etc. Furthermore, an event can be associated with a status of a drivable surface associated with the autonomous vehicle 122. The status of the drivable surface can indicate when a drivable surface is impassible (e.g., a bridge has collapsed, weather has caused an impassible condition, etc.). In yet additional and/or alternative examples, an event can be associated with a level of confusion associated with the computer system(s) 102 exceeding a confusion threshold. For instance, the computer system(s) 102 can receive real-time processed sensor data and may not be able to identify one or more objects in the environment surrounding the autonomous vehicle 122, which can indicate a level of confusion.

In at least one example, a fallback trajectory can correspond to a fallback action, which may correspond to a safety maneuver, such as aggressively stopping the autonomous vehicle 122, driving to the shoulder of the road and stopping, etc. In some examples, the fallback action may not be "smooth" to a passenger, but may safely navigate a situation responsive to an occurrence of an event In some examples, the fallback determination module 118 can receive an output fallback trajectory from the decision module 106 and/or the trajectory module 108. In such examples, the fallback determination module 118 can store the output fallback trajectory for a predetermined period of time, until a new output fallback trajectory is received, etc. In other examples, the fallback determination module 118 can generate a fallback trajectory based at least in part on real-time processed sensor data and/or hard-coded rule(s). In at least one example, a fallback trajectory can be determined based on a type of event. That is, different events can warrant different fallback actions.

In at least one example, the fallback determination module 118 can determine that the autonomous vehicle 122 is about to collide with an obstacle. That is, the fallback determination module 118 can leverage real-time processed sensor data to determine that an object is within a threshold distance of the autonomous vehicle 122. Based at least in part on determining that the autonomous vehicle 122 is about to collide with the obstacle, the fallback determination module 118 can access and/or generate a fallback trajectory which causes the autonomous vehicle 122 to perform a fallback action. Additionally and/or alternatively, in at least one example, the fallback determination module 118 can determine that the vehicle control device 114 is not receiving output trajectory(s) and/or other communications from the computer system(s) 102. That is, the fallback determination module 118 can determine that the computer system(s) 102 are nonresponsive and/or noncommunicative. Based at least in part on determining that the computer system(s) 102 are nonresponsive and/or noncommunicative, the fallback determination module 118 can access and/or generate the fallback trajectory responsive to such a determination.

In at least one example, the fallback determination module 118 can provide a fallback trajectory to the execution module 116 and the execution module 116 can compute commands for actuating steering and acceleration of the autonomous vehicle 122 to enable the autonomous vehicle 122 to follow the fallback trajectory.

The data input module 120 can receive input from one or more sensors on the autonomous vehicle 122. In at least one example, the autonomous vehicle 122 can have one or more sensors which can include LIDAR sensors for capturing LIDAR data for segmentation and/or classification, camera sensors for capturing vision data for image segmentation and/or classification, RADAR sensors for capturing range, angle, and/or velocity of objects in an environment, SONAR sensors for capturing acoustic information of objects in an environment, etc. In at least one example, the data input module 120 can receive data from each of the sensors (e.g., LIDAR sensors, camera sensors, RADAR sensors, SONAR sensors, etc.) described above and can process the data to identify objects and determine information about the objects in the environment. Additionally, the autonomous vehicle 122 can include ultrasonic transducers, wheel encoders, microphones, IMUs, accelerometers, gyroscopes, magnetometers, temperature sensors, humidity sensors, light sensors, GPS sensors, etc. The data input module 120 can process data received from the one or more sensors to determine a state of the autonomous vehicle 122 at a particular time. That is, the data input module 120 can process data received from the one or more sensors to determine a position of the autonomous vehicle 122 at a particular time, an orientation of the autonomous vehicle 122 at a particular time, a velocity of the autonomous vehicle 122 at a particular time, etc.

Such data (e.g., real-time processed sensor data) can be used by the fallback determination module 118 to determine when a fallback action is warranted and/or to generate a fallback trajectory. Additionally and/or alternatively, such data (e.g., real-time processed sensor data) can be used by the execution module 116 for computing a steering angle and velocity to enable the autonomous vehicle 122 to follow the output trajectory and/or fallback trajectory.

In at least one example, the execution module 116 and the fallback determination module 118 can have a fourth frequency of operation (e.g., $f_4$) that is different than the route planning module 104, the decision module 106, and/or the trajectory module 108. In at least one example, the execution module 116 and the fallback determination module 118 can operate at a highest frequency to enable the execution module 116 and the fallback determination module 118 to make near real-time decisions.

Additional details of the computer system(s) 102 and vehicle control device 114 are provided below in connection with FIG. 6.

As described above, in at least one example, individual of the modules can have different frequencies of operation. For instance, the route planning module 104 can have a first frequency of operation (e.g., $f_1$), the decision module 106 can have a second frequency of operation (e.g., $f_2$), the trajectory module 108 can have a third frequency of operation (e.g., $f_3$), and the execution module 116 and the fallback determination module 118 can have a fourth frequency of operation (e.g., $f_4$). In at least one example, the first frequency can be the lowest frequency (e.g., 10 Hertz) and the fourth frequency can be the highest frequency (e.g., 100 Hertz), as described above. This configuration enables the architecture 100 to distribute computational resources to modules based on a frequency in which individual modules receive updated data and/or a time period in which individual modules need to process and output data.

Additionally, as described above, the computer system(s) 102 can be separate and distinct from the vehicle control device 114. In some examples, this configuration can enhance safety, redundancy, and optimization. As described above, in at least one example, the fallback determination module 118 can determine the occurrence of an event warranting a fallback action, as described above. In such an example, the fallback determination module 118 can access and/or generate a fallback trajectory, which can be executed by the execution module 116. In at least one example, the fallback instruction can correspond to instructions for aggressively (but safely) stopping the autonomous vehicle 122. In other examples, the fallback instruction can correspond to performing some other safety maneuver.

Furthermore, as described above, data input module 120 can receive sensor data from one or more sensors. The data input module 120 can process sensor data received from the one or more sensors to determine the state of the autonomous vehicle 122 locally. The execution module 116 can utilize the state of the autonomous vehicle 122 for computing a steering angle and velocity to enable the autonomous vehicle 122 to follow the output trajectory without having to communicate with the computer system(s) 102. That is, separating the vehicle control device 114, which is executing the execution module 116, from the computer system(s) 102, which are executing one or more other modules (e.g., route planning module 104, decision module 106, trajectory module 108, etc.), can conserve computational resources expended by the vehicle control device 114 by enabling the vehicle control device 114 to execute trajectory(s) locally.

In an additional and/or alternative example, the separation of the computer system(s) 102 from the vehicle control device 114 can be useful for troubleshooting. For instance, a programmer can identify an error, flaw, failure, fault, etc. associated with either the computer system(s) 102 or the vehicle control device 114. Accordingly, the programmer can troubleshoot either the computer system(s) 102 or the vehicle control device 114, instead of troubleshooting the entire system.

Furthermore, the separation of the computer system(s) 102 from the vehicle control device 114 can enable easier safety certification of the vehicle control device 114. That is, by separating the planning functionality (on the computer system(s) 102) from the execution functionality (on the vehicle control device 114), the architecture 100 can minimize the amount of code executing on the vehicle control device 114, making safety certification(s) easier to obtain.

FIGS. 2-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 2:
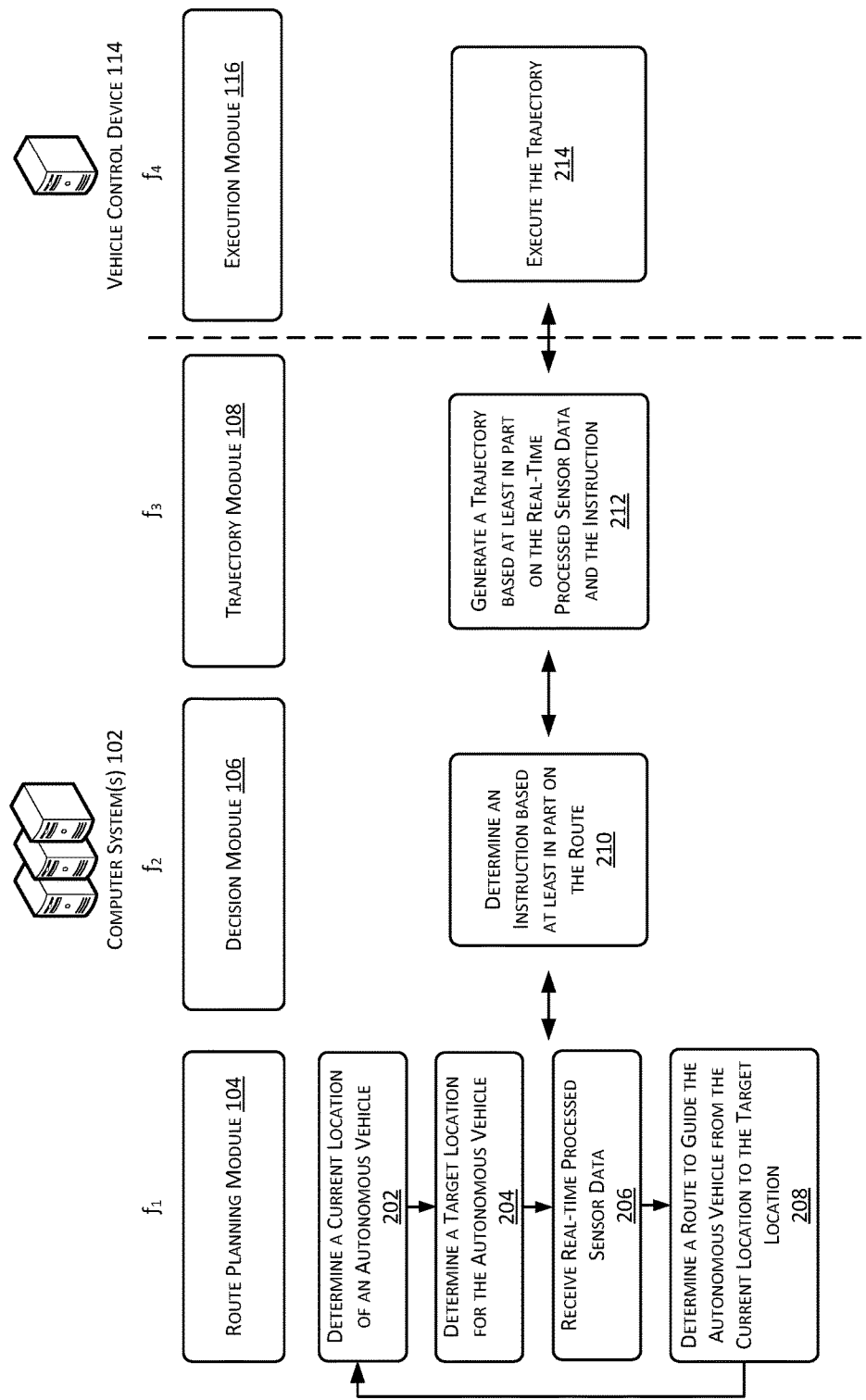
FIG. 2 depicts an example process for generating and executing trajectories to control autonomous vehicles, as described herein.

FIG. 2 depicts an example process 200 for generating and executing trajectories to control autonomous vehicles.

Block 202 illustrates determining a current location of an autonomous vehicle. As described above, the data input module 110 can receive data from the one or more sensors, and can process the data (i.e., real-time processed sensor data), to determine a position of the autonomous vehicle 122 at a particular time, an orientation of the autonomous vehicle 122 at a particular time, a velocity of the autonomous vehicle 122 at a particular time, etc. In at least one example, the route planning module 104 can analyze the real-time processed sensor data to determine a current pose of an autonomous vehicle. In at least one example, based at least in part on the current pose, the route planning module 104 can determine the current location of the autonomous vehicle, which can correspond to a first location on a map 136 stored in the data store 112.

Block 204 illustrates determining a target location for the autonomous vehicle. In at least one example, the route planning module 104 can receive an indication of a target location. In at least one example, the target location can correspond to a second location on the map 136.

Block 206 illustrates receiving real-time processed sensor data. As described above, the data input module 110 can receive input from one or more sensors on the autonomous vehicle 122. In at least one example, the autonomous vehicle 122 can have one or more sensors which can include LIDAR sensors for capturing LIDAR data for segmentation and/or classification, camera sensors for capturing vision data for image segmentation and/or classification, RADAR sensors for capturing range, angle, and/or velocity of objects in an environment, SONAR sensors for capturing acoustic information of objects in an environment, etc. In at least one example, the data input module 110 can receive data from each of the sensors (e.g., LIDAR sensors, camera sensors, RADAR sensors, SONAR sensors, etc.) described above and can process the data to identify objects and determine information about the objects in the environment. Additionally, the autonomous vehicle 122 can include ultrasonic transducers, wheel encoders, microphones, IMU(s), accelerometers, gyroscopes, magnetometers, temperature sensors, humidity sensors, light sensors, GPS sensors, etc. The data input module 110 can process data received from the one or more sensors to determine a state of the autonomous vehicle 122 at a particular time. That is, the data input module 110 can process data received from the one or more sensors to determine a position of the autonomous vehicle 122 at a particular time, an orientation of the autonomous vehicle 122 at a particular time, a velocity of the autonomous vehicle 122 at a particular time, etc.

In at least one example, the route planning module 104 may receive the real-time processed sensor data from the data input module 110. While FIG. 2 illustrates the route planning module 104 as receiving the real-time processed sensor data, each of the other modules (e.g., decision module 106 and/or trajectory module 108) may receive the real-time processed sensor data from the data input module 110 and/or may access the real-time processed sensor data from the route planning module 104.

Block 208 illustrates determining, at a first operational frequency, a route to guide the autonomous vehicle from the current location to the target location. As described above, the route planning module 104, which can operate at a first operational frequency, can be configured to determine a most efficient route to travel from the current location to the target location. In at least one example, the route planning module 104 can access the map 136 and can perform a search, such as a graph search, on top of the map 136 to identify a route to guide the autonomous vehicle 122 from the current location to the target location. As described above, in at least one example, the route planning module 104 can utilize a graph traversal algorithm to identify a route to guide an autonomous vehicle from the current location to the target location. Such a route may correspond to particular roads to traverse in a road network.

As described above, in some examples, the route planning module 104 can identify two or more candidate routes for guiding the autonomous vehicle 122 from the current location to the target location. In such examples, the route planning module 104 can rank the two or more candidate routes based on route planning constraint(s). Route planning constraint(s) can include rules of the road, travel time, travel distance, weather, traffic, personal preferences, etc. In at least one example, the route planning module 104 can determine that a top-ranking candidate route is the route for guiding the autonomous vehicle 122 from the current location to the target location. The route planning module 104 can output a sequence of waypoints corresponding to the route to the decision module 106.

The route planning module 104 may repeatedly perform operations associated with blocks 202-208 to output new sequences of waypoints corresponding to updated routes to the decision module 106.

Block 210 illustrates determining, at a second operational frequency, an instruction based at least in part on the route. In at least one example, the decision module 106, which can operate at a second operational frequency, can receive the route (i.e., the sequence of waypoints) and can generate an instruction for guiding the autonomous vehicle 122 along at least a portion of the route from the current location to the target location. In at least one example, the decision module 106 can determine how to guide the autonomous vehicle 122 from a first waypoint in the sequence of waypoints to a second waypoint in the sequence of waypoints. In some examples, the instruction can be a trajectory. In such an example, the decision module 106 can generate a sequence of actions (e.g., drive down the road, accelerate, change lane, turn left, etc.) to guide the autonomous vehicle 122 along the route. In other examples, the instruction can be a policy. A policy can be used to determine a trajectory of the autonomous vehicle 122 based on real-time processed sensor data received from sensor(s) on the autonomous vehicle 122.

In at least one example, the decision module 106 can utilize one or more models and/or algorithms to determine an instruction for guiding the autonomous vehicle 122 from the first location to the second location in view of constraint(s). For instance, in at least one example, the decision module 106 can utilize a combination of temporal logic (e.g., linear temporal logic (LTL), signal temporal logic (STL), interval temporal logic (ITL), computational tree logic (CTL) property specification language (PSL), Hennessy-Milner logic (HML), etc.) and a search algorithm (e.g., policy tree search, Monte Carlo Tree Search (MCTS), exhaustive search, etc.) to determine one or more candidate instructions and evaluate a performance of each of the potential instructions prior to determining which instruction to select, as described above. The decision module 106 can output the instruction to the trajectory module 108.

The decision module 106 may output new instructions based on receiving updated sequences of waypoints corresponding to updated routes. That is, the decision module 106 may repeatedly perform operations associated with block 210.

Block 212 illustrates generating, at a third operational frequency, a trajectory based at least in part on the real-time processed sensor data and the instruction. In at least one example, the trajectory module 108, which can operate at a third operational frequency, can receive the instruction and can optimize the instruction based on the real-time processed sensor data. In at least one example, the trajectory module 108 can access, receive, and/or determine real-time processed sensor data (e.g., from the data input module 110) to determine object(s) in the environment which the autonomous vehicle 122 is travelling. In the at least one example, the trajectory module 108 can process the instruction in view of the real-time processed sensor data.

In an example where the instruction is a trajectory, the trajectory module 108 can leverage model(s) and/or algorithm(s), constraint(s), and/or cost(s) to optimize the trajectory. For instance, the trajectory module 108 can utilize model(s) and/or algorithm(s) including, but not limited to, differential dynamic programming, interior point optimization, sequential quadratic programming, etc. to refine the trajectory, as described above. Based at least in part on processing the trajectory, in view of the real-time processed sensor data, the trajectory module 108 can generate an output trajectory.

In an example where the instruction is a policy, the trajectory module 108 can leverage model(s) and/or algorithm(s), constraint(s), and/or cost(s) to generate a trajectory based on the policy and real-time processed sensor data. For instance, the trajectory module 108 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory. In some examples, the trajectory may be calculated as a receding horizon. In such examples, the calculated trajectory may span a finite time into the future, such as, for example, 2 ms to 10 s, though any horizon time is contemplated. In some examples, multiple trajectories may be determined substantially simultaneously. In those examples, an output trajectory may be selected as a trajectory having the lowest cost, no constraint violations, or the like.

The trajectory module 108 may generate new trajectories based on receiving updated instructions from the decision module 106. That is, the trajectory module 108 may repeatedly perform operations associated with block 212.

Block 214 illustrates executing, at a fourth operational frequency, the trajectory. The execution module 116, which can operate at a fourth operational frequency, can receive the output trajectory from the trajectory module 108 and can compute commands for actuating steering and acceleration of the autonomous vehicle 122 to enable the autonomous vehicle 122 to follow the output trajectory. In at least one example, the execution module 116 can receive the output trajectory and can compute a steering angle and velocity to enable the autonomous vehicle 122 to follow the output trajectory.

As described above, the execution module 116 can be stored on the vehicle control device 114, which can be a separate and distinct computer system than computer system(s) 102. That is, computer system(s) 102 can execute operations represented by blocks 202-212 and the vehicle control device 114 can execute operations represented by block 214. Such separation can provide enhanced safety, redundancy, and optimization, as described above. Additionally, such separation can be useful for troubleshooting problems associated with individual components of the architecture. Furthermore, such separation can be useful for obtaining safety certification(s) for components of the architecture.

Figure 3:
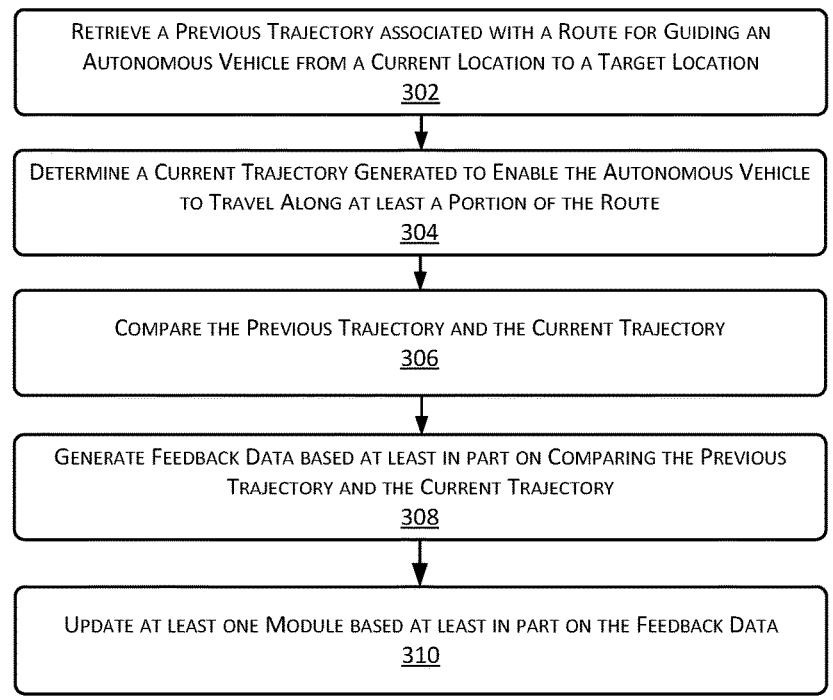
FIG. 3 depicts an example process for generating feedback data and using the feedback data to update aspects of the architecture, as described herein.

FIG. 3 depicts an example process 300 for generating feedback data and using the feedback data to update aspects of the architecture.

Block 302 illustrates retrieving a previous trajectory associated with a trajectory for guiding an autonomous vehicle from a current location to a target location. In at least one example, a module (e.g., the decision module 106, the trajectory module 108, etc.) can retrieve a previous trajectory. Such a trajectory may be a most recent output trajectory that was sent to the execution module 116.

Block 304 illustrates determining a current trajectory. In at least one example, a module (e.g., the decision module 106, the trajectory module 108, etc.) can determine a trajectory to enable the autonomous vehicle to travel along at least a portion of a trajectory from the current location to the target location. In some examples, the current trajectory may be calculated based at least in part on one or more of the sensors on the autonomous vehicle. As a non-limiting example, subsequent GPS measurements may provide a current position and velocity.

Block 306 illustrates comparing the previous trajectory and the current trajectory. In at least one example, the module (e.g., the decision module 106, the trajectory module 108, etc.) can compare the previous trajectory and the current trajectory, and the module can generate feedback data based at least in part on comparing the previous trajectory and the executed trajectory, as illustrated in block 308. As a non-limiting example, the comparison may comprise a difference between one or more of the velocities or positions of the current trajectory and an estimated evolution of the previous trajectory to the current time (e.g., by stepping forward in time using one or more model(s) 124). In at least one example, by comparing the previous trajectory with the current trajectory, the module can determine whether the autonomous vehicle is behaving as it is expected to behave.

Block 310 illustrates updating at least one module based at least in part on the feedback data. In at least one example, the module can correspond to the decision module 106, which can leverage the feedback data to update the model(s) and/or algorithm(s) utilized to generate instructions based on routes. In an additional and/or alternative example, the module can correspond to the trajectory module 108, which can leverage the feedback data to update the model(s) and/or algorithm(s) utilized to generate trajectories based on instructions received from the decision module 106. As a non-limiting example, a difference in one or more of the position or velocity may be indicative of an invalid estimate in the model (e.g. friction, vehicle steering, braking capacity, torque, etc.). Such a difference may be fed back into the control mechanism to account for differences in the model.

Figure 4:
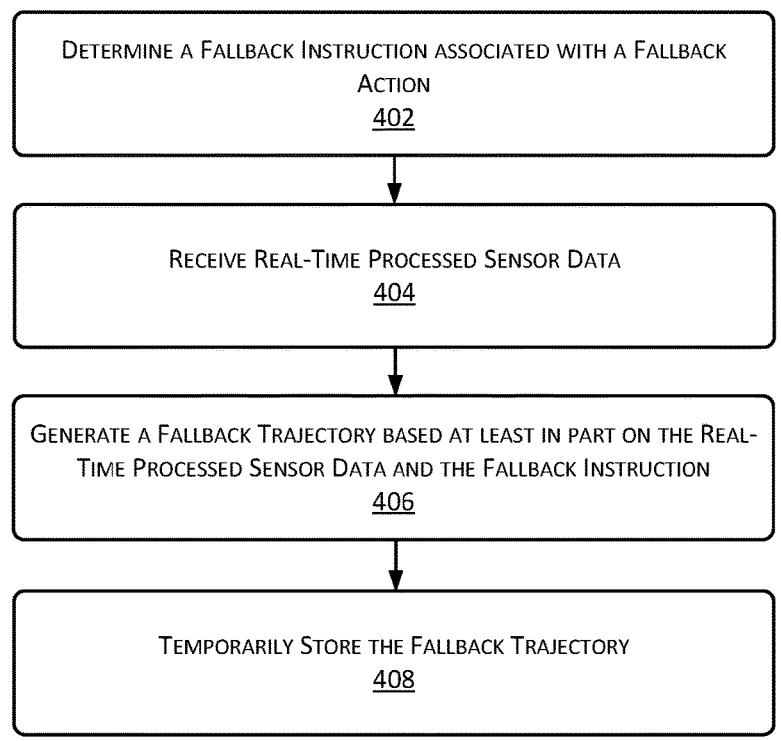
FIG. 4 depicts an example process for generating a fallback trajectory, as described herein.

FIG. 4 depicts an example process 400 for generating a fallback trajectory.

Block 402 illustrates determining a fallback instruction associated with a fallback action. As described above, in at least one example, the decision module 106 can determine a fallback instruction utilizing one or more models and/or algorithms. The fallback instruction can be an instruction that the autonomous vehicle 122 is to follow when an event occurs. In at least one example, the decision module 106 can provide the fallback instruction to the trajectory module 108 at the same time that the decision module 106 provides an instruction to the trajectory module 108 (i.e., the decision module 106 can provide two instructions to the trajectory module 108).

Block 404 illustrates receiving real-time processed sensor data. As described above, the data input module 110 can receive input from one or more sensors (e.g., LIDAR sensors, camera sensors, RADAR sensors, SONAR sensors, etc.) on the autonomous vehicle 122 and can process the data to identify objects and determine information about the objects in the environment. Additionally, the autonomous vehicle 122 can include ultrasonic transducers, wheel encoders, microphones, IMU(s), accelerometers, gyroscopes, magnetometers, temperature sensors, humidity sensors, light sensors, GPS sensors, etc. The data input module 110 can process data received from the one or more sensors to determine a state of the autonomous vehicle 122 at a particular time. That is, the data input module 110 can process data received from the one or more sensors to determine a position of the autonomous vehicle 122 at a particular time, an orientation of the autonomous vehicle 122 at a particular time, a velocity of the autonomous vehicle 122 at a particular time, etc.

Block 406 illustrates generating a fallback trajectory based at least in part on the real-time processed sensor data and the fallback instruction. In at least one example, the trajectory module 108 can receive a fallback instruction from the decision module 106. In such examples, the trajectory module 108 can generate an output fallback trajectory based on processing the fallback instruction.

In an example where the fallback instruction is a trajectory, the trajectory module 108 can leverage model(s) and/or algorithm(s), constraint(s), and/or cost(s) to optimize the fallback trajectory. For instance, the trajectory module 108 can utilize model(s) and/or algorithm(s) including, but not limited to, differential dynamic programming, interior point optimization, sequential quadratic programming, etc. to refine the fallback trajectory, as described above. Additionally, or in the alternative, the fallback trajectory may be determined in any way the output trajectory is determined, as described in detail herein. Based at least in part on processing the fallback trajectory, in view of the real-time processed sensor data, the trajectory module 108 can generate an output fallback trajectory.

In an example where the fallback instruction is a policy, the trajectory module 108 can leverage model(s) and/or algorithm(s), constraint(s), and/or cost(s) to generate a fallback trajectory based on the policy and real-time processed sensor data. For instance, the trajectory module 108 can utilize model(s) and/or algorithm(s) including, but not limited to, differential dynamic programming, interior point optimization, sequential quadratic programming, etc. to generate a fallback trajectory based on the policy. For the purpose of this discussion, the fallback trajectory can be called an output fallback trajectory.

Block 408 illustrates temporarily storing the fallback trajectory. The trajectory module 108 can provide the output fallback trajectory to the vehicle control device 114. In at least one example, the fallback determination module 118 can receive the output fallback trajectory and can store the output fallback trajectory for a predetermined period of time, until a new fallback trajectory is received, etc.

Figure 5:
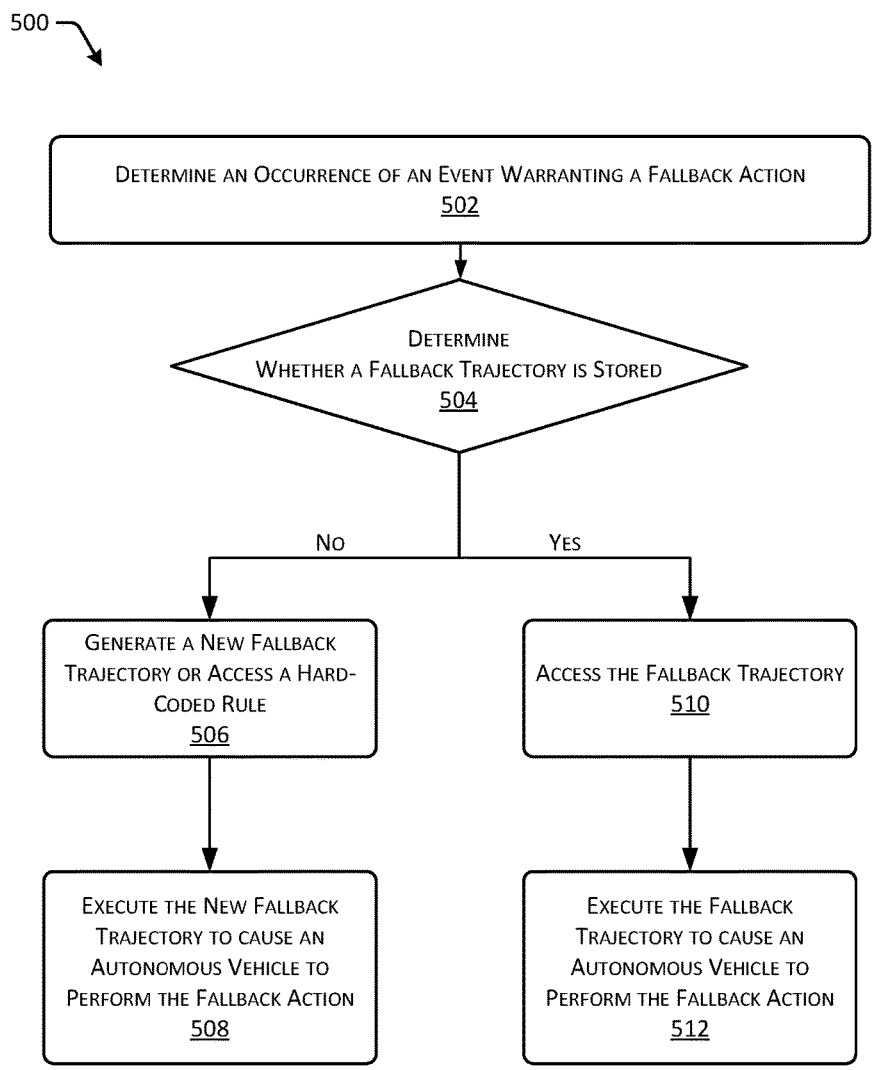
FIG. 5 depicts an example process for executing a fallback trajectory, as described herein.

FIG. 5 depicts an example process 500 for executing a fallback trajectory.

Block 502 illustrates determining an occurrence of an event warranting a fallback action. As described above, the fallback determination module 118 can determine an occurrence of an event warranting a fallback action. Various examples of events warranting a fallback action are described above.

Block 504 illustrates determining whether a fallback trajectory is stored. Based at least in part on determining an occurrence of an event, the fallback determination module 118 can determine whether a fallback trajectory is stored. As described above, in some examples, the fallback determination module 118 can receive an output fallback trajectory from the decision module 106 and/or the trajectory module 108. In such examples, the fallback determination module 118 can store the output fallback trajectory for a predetermined period of time, until a new output fallback trajectory is received, etc.

Based at least in part on determining that a fallback trajectory is not stored in the fallback determination module 118, the fallback determination module 118 can generate a new fallback trajectory or access a hard-coded rule associated with the fallback determination module 118, as illustrated in block 506. That is, the fallback determination module 118 can access real-time processed data to determine a fallback trajectory for causing the autonomous vehicle 122 to perform a fallback action. Or, the fallback determination module 118 can access a hard-coded rule that provides an instruction on how to respond. In some examples, the fallback determination module 118 can leverage policies to generate the new fallback trajectory. For instance, the fallback determination module 118 can utilize a policy that indicates that the autonomous vehicle 112 should not stop in the middle of an intersection, the middle of a crosswalk, etc.

Block 508 illustrates executing the new fallback trajectory to cause an autonomous vehicle to perform the fallback action. In at least one example, the fallback determination module 118 can provide the new fallback trajectory to the execution module 116 and the execution module 116 can compute commands for actuating steering and acceleration of the autonomous vehicle 122 to enable the autonomous vehicle 122 to follow the fallback trajectory.

Based at least in part on determining that a fallback trajectory is stored in the fallback determination module 118, the fallback determination module 118 can access the fallback trajectory, as illustrated in block 510. Block 512 illustrates executing the fallback trajectory to cause an autonomous vehicle to perform the fallback action. In at least one example, the fallback determination module 118 can provide the fallback trajectory to the execution module 116 and the execution module 116 can compute commands for actuating steering and acceleration of the autonomous vehicle 122 to enable the autonomous vehicle 122 to follow the fallback trajectory.

Figure 6:
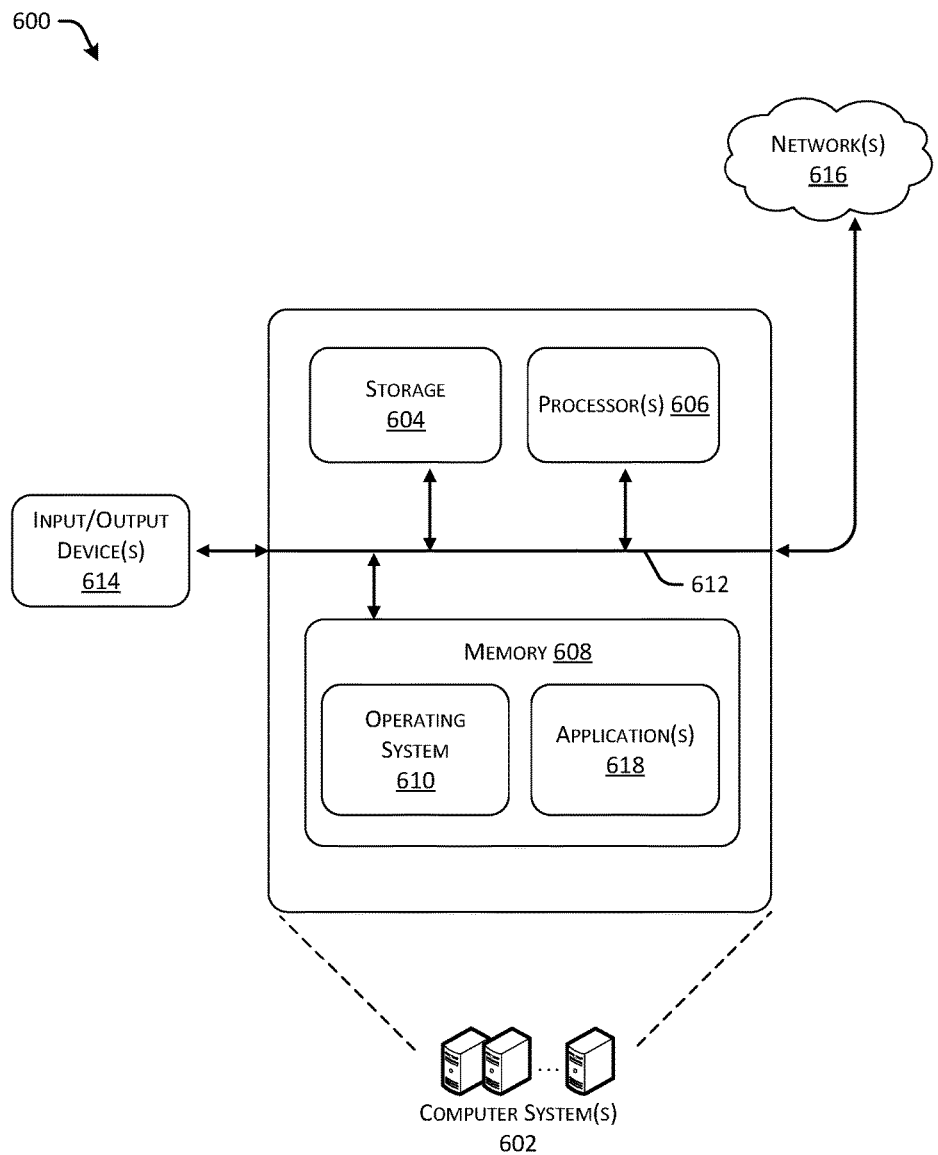
FIG. 6 depicts a block diagram of an example computer system for implementing the techniques described herein.

FIG. 6 illustrates additional details associated with an architecture for trajectory planning and execution, as described above with reference to FIG. 1. FIG. 6 illustrates an environment 600 in which the disclosures can be implemented in whole or in part. The environment 600 depicts one or more computer systems 602 that comprise a storage 604, one or more processor(s) 606, a memory 608, and an operating system 610. The storage 604, the processor(s) 606, the memory 608, and the operating system 610 can be communicatively coupled over a communication infrastructure 612. Optionally, the computer system(s) 602 can interact with a user, or environment, via input/output (I/O) device(s) 614, as well as one or more other computer system(s) over a network 616, via the communication infrastructure 612. The operating system 610 can interact with other components to control one or more applications 618.

In at least one example, the computer system(s) 602 illustrated in FIG. 6 may be distributed. In some instances, at least a portion of the computer system(s) 602 can correspond to the computer system(s) 102 described above with reference to FIG. 1. Further, the computer system(s) 602 can implement any hardware and/or software to implement the modules 104, 106, 108, and 110 to perform trajectory planning, as discussed herein. Additionally, at least a portion of the computer system(s) 602 can correspond to the vehicle control device 114 described above with reference to FIG. 1. Further, the computer system(s) 602 can implement any hardware and/or software to implement the modules 116, 118, and 120 to perform trajectory execution, as discussed herein.

The systems and methods described herein can be implemented in software or hardware or any combination thereof. The systems and methods described herein can be implemented using one or more computer system(s) which may or may not be physically or logically separate from each other. The methods can be performed by components arranged as either on-premise hardware, on-premise virtual systems, or hosted-private instances. Additionally, various aspects of the methods described herein can be combined or merged into other functions.

With reference to the computer system(s) illustrated in FIG. 6, a processor or computer system can be configured to particularly perform some or all of the methods described herein. In some embodiments, the methods can be partially or fully automated by one or more computers or processors. The systems and methods described herein can be implemented using a combination of any of hardware, firmware and/or software. The present systems and methods described herein (or any part(s) or function(s) thereof) can be implemented using hardware, software, firmware, or a combination thereof and can be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one example embodiment, the systems and methods described herein can be directed toward one or more computer systems capable of carrying out the functionality described herein. Example computer system(s)s can be, but are not limited to, a personal computer (PC) system running any operating system such as, but not limited to, OS X™ iOS™, Linux™, Android™, and Microsoft™ Windows™. However, the systems and methods described herein may not be limited to these platforms. Instead, the systems and methods described herein can be implemented on any appropriate computer system running any appropriate operating system. Other components of the systems and methods described herein, such as, but not limited to, a computer system(s), a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., can also be implemented using a computer system(s). Services can be provided on demand using, e.g., but not limited to, an interactive television (iTV), a video on demand system (VOD), and via a digital video recorder (DVR), or other on demand viewing system.

The computer system(s) can include one or more processors. The processor(s) can be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computer system(s) can include a display interface that can forward graphics, text, and other data from the communication infrastructure for display on a display unit.

The computer system(s) can also include, but is not limited to, a main memory, random access memory (RAM), and a secondary memory, etc. The secondary memory can include, for example, a hard disk drive and/or a removable storage drive, such as a compact disc drive CD-ROM, etc. The removable storage drive can read from and/or written to a removable storage unit. As can be appreciated, the removable storage unit can include a computer usable storage medium having stored therein computer software and/or data. In some embodiments, a machine-accessible medium can refer to any storage device used for storing data accessible by a computer. Examples of a machine-accessible medium can include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor can also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The computer system(s) can be in communication with a computerized data storage system. The data storage system can include a non-relational or relational data store, such as a MySQL™ or other relational database. Other physical and logical database types could be used. The data store can be a database server, such as Microsoft SQL Server™, Oracle™, IBM DB2™, SQLITE™, or any other database software, relational or otherwise. The data store can store the information identifying syntactical tags and any information required to operate on syntactical tags. In some embodiments, the processing system can use object-oriented programming and can store data in objects. In these embodiments, the processing system can use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative example embodiments, secondary memory can include other similar devices for allowing computer programs or other instructions to be loaded into computer system. Such devices can include, for example, a removable storage unit and an interface. Examples of such can include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which can allow software and data to be transferred from the removable storage unit to computer system.

The computer system(s) can also include an input device such as, but not limited to, a voice input device, such as a microphone, touch screens, gesture recognition devices, such as cameras, other natural user interfaces, a mouse or other pointing device such as a digitizer, and a keyboard or other data entry device. The computer system(s) can also include output devices, such as but not limited to, a display, and a display interface. The computer system(s) can include input/output (I/O) devices such as but not limited to a communications interface, cable and communications path, etc. These devices can include, but are not limited to, a network interface card, and modems. Communications interface(s) can allow software and data to be transferred between a computer system and one or more external devices.

In one or more embodiments, the computer system(s) can be operatively coupled to an automotive system. Such automotive system can be either manually operated, semi-autonomous, or fully autonomous. In such an embodiment, input and output devices can include one or more image capture devices, controllers, microcontrollers, and/or other processors to control automotive functions such as, but not limited to, acceleration, braking, and steering. Further, communication infrastructure in such embodiments can also include a Controller Area Network (CAN) bus.

In one or more embodiments, the computer system(s) can be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and can be applicable to any application utilizing machine vision.

In one or more embodiments, the present embodiments can be practiced in the environment of a computer network or networks. The network can include a private network, or a public network (for example the Internet, as described below), or a combination of both. The network can include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An example computer and/or telecommunications network environment in accordance with the present embodiments can include nodes, which can include hardware, software, or a combination of hardware and software. The nodes can be interconnected via a communications network. Each node can include one or more processes, executable by processors incorporated into the nodes. A single process can be run by multiple processors, or multiple processes can be run by a single processor, for example. Additionally, each of the nodes can provide an interface point between network and the outside world, and can incorporate a collection of sub-networks.

In an example embodiment, the processes can communicate with one another through interprocess communication pathways supporting communication through any communications protocol. The pathways can function in sequence or in parallel, continuously or intermittently. The pathways can use any of the communications standards, protocols or technologies, described herein with respect to a communications network, in addition to standard parallel instruction sets used by many computers.

The nodes can include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes can be made possible by a communications network. A node can be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of example wireless protocols and technologies used by a communications network can include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure can include apparatuses for performing the operations herein. An apparatus can be specially constructed for the desired purposes, or it can comprise general purpose computer system(s) selectively activated or reconfigured by a program stored in the computer system(s).

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present example embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals can be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters can also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP can be used in implementing interfaces between programming modules. The components and functionality described herein can be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor can receive and store instructions and data from a computerized data storage device such as a read-only memory, a random access memory, both, or any combination of the data storage devices described herein. A processor can include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in computer system(s) that includes a back-end component, such as a data server, or that includes a middleware component, such as an application server or an Internet server, or that includes a front-end component, such as a client computer having a graphical user interface or an Internet browser, or any combination of them. The components of the computer system(s) can be connected by any form or medium of digital data communication such as a communication network. Examples of communication networks include, e.g., a LAN, a WAN, and the computers and networks that form the Internet.

One or more embodiments of the present disclosure can be practiced with other computer system configurations, including hand-held devices, microprocessor systems, microprocessor-based or programmable consumer electronics, minicomputers, mainframe computers, etc. The systems and methods described herein can also be practiced in distributed computing environments where tasks are performed by remote processing devices that are linked through a network.

The terms "computer program medium" and "computer readable medium" can be used to generally refer to media such as but not limited to removable storage drive, a hard disk installed in hard disk drive. These computer program products can provide software to computer system. The systems and methods described herein can be directed to such computer program products.

References to "one embodiment," "an embodiment," "example embodiment," "various embodiments," etc., can indicate that the embodiment(s) of the present disclosure can include a particular feature, structure, or characteristic, but not every embodiment necessarily includes the particular feature, structure, or characteristic. Further, repeated use of the phrase "in one embodiment," or "in an example embodiment," do not necessarily refer to the same embodiment, although they can. Similarly, references to "instances" can indicate that various instance(s) of the present disclosure can include a particular feature, structure, or characteristic, but not every instance necessarily includes the particular feature, structure, or characteristic. Further, repeated use of the phrase "in some instances" does not necessarily refer to the same instance, although it can.

In the description and claims, the terms "coupled" and "connected," along with their derivatives, can be used. It should be understood that these terms can be not intended as synonyms for each other. Rather, in particular embodiments, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

An algorithm can be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it can be appreciated that throughout the specification terms such as "processing," "computing," "calculating," "determining," or the like, refer to the action and/or processes of a computer or computer system, or similar electronic computer system(s), that manipulate and/or transform data represented as physical, such as electronic, quantities within the computer system's registers and/or memories into other data similarly represented as physical quantities within the computer system's memories, registers or other such information storage, transmission or display devices.

In a similar manner, the term "processor" can refer to any device or portion of a device that processes electronic data from registers and/or memory to transform that electronic data into other electronic data that can be stored in registers and/or memory. As non-limiting examples, "processor" can be a Central Processing Unit (CPU) or a Graphics Processing Unit (GPU). A "computing platform" can comprise one or more processors. As used herein, "software" processes can include, for example, software and/or hardware entities that perform work over time, such as tasks, threads, and intelligent agents. Also, each process can refer to multiple processes, for carrying out instructions in sequence or in parallel, continuously or intermittently. The terms "system" and "method" are used herein interchangeably insofar as the system can embody one or more methods and the methods can be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments can be used and that changes or alterations, such as structural changes, can be made. Such embodiments, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

Example Clauses

A. A system embodied in an autonomous vehicle, the system comprising: a first computer system comprising: one or more first processors; and one or more first computer readable storage media communicatively coupled to the one or more first processors and storing one or more first modules including instructions that are executable by the one or more first processors, the one or more first modules comprising: a route planning module configured to generate a route between a current location of the autonomous vehicle and a target location of the autonomous vehicle, the route planning module operating at a first operational frequency; a decision module configured to generate an instruction based on the route, the instruction including a sequence of actions to guide the autonomous vehicle along at least a portion of the route, the decision module operating at a second operational frequency; and a trajectory module configured to: access real-time processed sensor data; and generate an output trajectory based at least in part on the instruction and the real-time processed sensor data, the trajectory module operating at a third operational frequency; and a second computer system comprising: one or more second processors; and one or more second computer readable storage media communicatively coupled to the one or more second processors and storing one or more second modules including instructions that are executable by the one or more second processors, the one or more second modules comprising an execution module configured to generate one or more signals for causing the autonomous vehicle to drive along the output trajectory, the execution module operating at a fourth operational frequency.

B. A system as paragraph A recites, wherein the one or more second modules include a fallback determination module, the fallback determination module configured to: receive, from the first computer system, a fallback trajectory for causing the autonomous vehicle perform a safety maneuver; and store the fallback trajectory for a predetermined period of time, wherein the fallback determination module operates at the fourth operational frequency.

C. A system as paragraph B recites, wherein the fallback determination module is further configured to: determine an occurrence of an event warranting a fallback action; and access the fallback trajectory.

D. A system as any of paragraphs A-C recite, wherein the one or more second modules include a fallback determination module, the fallback determination module configured to: determine an occurrence of an event warranting a fallback action; and generate a fallback trajectory for causing the autonomous vehicle to perform a safety maneuver, wherein the fallback determination module operates at the fourth operational frequency.

E. A system as any of paragraphs A-D recite, wherein the execution module is further configured to: receive a fallback trajectory for causing the autonomous vehicle to perform a safety maneuver; and execute the fallback trajectory to cause the autonomous vehicle to perform the safety maneuver.

F. A system as any of paragraphs A-E recite, wherein the fourth operational frequency is higher than the first operational frequency, the second operational frequency, and the third operational frequency.

G. A system as any of paragraphs A-F recite, wherein: the third operational frequency is higher than the first operational frequency and the second operational frequency; and the third operational frequency is lower than the fourth operational frequency. The system of claim 1, wherein the first operational frequency is lower than the second operational frequency, the third operational frequency, and the fourth operational frequency.

H. A method implemented by a transportable computer system, the method comprising: determining a current location of the transportable computer system; determining a target location for the transportable computer system; receiving, from one or more sensors associated with the transportable computer system, real-time processed sensor data; determining, at a first operational frequency, a route to guide the transportable computer system from the current location to the target location; determining, at a second operational frequency, an instruction for guiding the transportable computer system along at least a portion of the route based at least in part on the real-time processed sensor data; generating, at a third operational frequency, a trajectory based at least in part on the real-time processed sensor data and the instruction; and executing, at a fourth operational frequency, the trajectory to cause the transportable computer system to travel along the route.

I. A method as paragraph H recites, wherein: the determining the route is performed by a first computer system associated with the transportable computer system; the determining the instruction for guiding the transportable computer system along at least the portion of the route is performed by the first computer system; and the generating the trajectory is performed by the first computer system.

J. A method as paragraph I recites, wherein the executing the trajectory to cause the transportable computer system to travel along the route is performed by a second computer system associated with the transportable computer system, the second computer system being different than the first computer system.

K. A method as any of paragraphs I-J recite, wherein the instruction comprises a policy and generating the trajectory based at least in part on the real-time processed sensor data comprises generating the trajectory based on the policy.

L. A method as any of paragraphs I-J recite, further comprising: generating, at the second operational frequency, a fallback instruction for causing the transportable computer system to perform a fallback action; generating, at the third operational frequency, a fallback trajectory based on the fallback instruction; and outputting the fallback trajectory with the trajectory at a substantially same time.

M. A method as any of paragraphs I-L recite, further comprising: determining an occurrence of an event warranting a fallback action; generating, at the fourth operational frequency, a fallback trajectory for causing the transportable computer system to perform the fallback action; and executing the fallback trajectory to cause the transportable computer system to perform the fallback action.

N. A system comprising: one or more processors; and one or more computer readable storage media communicatively coupled to the one or more processors and storing one or more modules including instructions that are executable by the one or more processors, the one or more first modules comprising: a route planning module configured to generate a route between a current location of the system and a target location of the system, the route planning module operating at a first operational frequency; a decision module configured to generate an instruction based on the route, the instruction including a sequence of actions to guide the system along the route, the decision module operating at a second operational frequency; a trajectory module configured to: access real-time processed sensor data; and generate an output trajectory based at least in part on the instruction and the real-time processed sensor data, the trajectory module operating at a third operational frequency; and an execution module configured to generate one or more signals for causing the system to move along the output trajectory, the execution module operating at a fourth operational frequency.

O. A system as paragraph N recites, wherein the route planning module, the decision module, and the trajectory module are associated with a first computer system of the system and the execution module is associated with a second computer system of the system that is separate from the first computer system.

P. A system as paragraph O recites, the one or more modules further comprising a fallback determination module associated with the second computer system, the fallback determination module configured to: determine an occurrence of an event warranting a fallback action; access a fallback trajectory for causing the system to perform the fallback action; and cause the fallback trajectory to be executed to cause the system to perform the fallback action.

Q. A system as paragraph P recites, wherein the event comprises: an object is within a threshold distance of the system; an object is predicted to be within a threshold distance of the system; an absence of communication between the first computer system and the second computer system; a confusion level associated with the system is above a confusion threshold; a failure associated with a sensor of the system; a malfunction of a component associated with the system; a change in an occupancy status associated with the system; a change in a status of a drivable surface associated with the trajectory; or a probability of a collision exceeds a threshold probability.

R. A system as any of paragraphs N-Q recite, wherein: the first operational frequency is less than the second operational frequency; the second operational frequency is less than the third operational frequency; and the third operational frequency is less than the fourth operational frequency.

S. A system as any of paragraphs N-Q recite, wherein the decision module is further configured to: access an executed trajectory; compare the executed trajectory with the output trajectory; generate feedback data based at least in part on comparing the executed trajectory and the output trajectory; and updating at one or more of a model or an algorithm based at least in part on the feedback data.

While the example clauses described above are described with respect to one particular implementation, it should be understood that, in the context of this document, the content of the example clauses can also be implemented via a method, device, system, and/or computer storage media.

What is claimed is:

1. A system embodied in an autonomous vehicle, the system comprising:
a first computer system comprising:

one or more first processors; and
one or more first computer readable storage media communicatively coupled to the one or more first processors and storing one or more first modules including instructions that are executable by the one or more first processors, the one or more first modules comprising:
a route planning module configured to generate a route between a current location of the autonomous vehicle and a target location of the autonomous vehicle, the route planning module operating at a first operational frequency;
a decision module configured to generate an instruction based on the route, the instruction including a sequence of actions to guide the autonomous vehicle along at least a portion of the route, the decision module operating at a second operational frequency; and
a trajectory module configured to:
access real-time processed sensor data; and
generate an output trajectory based at least in part on the instruction and the real-time processed sensor data, the trajectory module operating at a third operational frequency; and
a second computer system comprising:
one or more second processors; and
one or more second computer readable storage media communicatively coupled to the one or more second processors and storing one or more second modules including instructions that are executable by the one or more second processors, the one or more second modules comprising an execution module configured to generate one or more signals for causing the autonomous vehicle to drive along the output trajectory, the execution module operating at a fourth operational frequency.

2. The system of claim 1, wherein the one or more second modules include a fallback determination module, the fallback determination module configured to:
receive, from the first computer system, a fallback trajectory for causing the autonomous vehicle perform a safety maneuver; and
store the fallback trajectory for a predetermined period of time,
wherein the fallback determination module operates at the fourth operational frequency.

3. The system of claim 2, wherein the fallback determination module is further configured to:
determine an occurrence of an event warranting a fallback action; and
access the fallback trajectory.

4. The system of claim 1, wherein the one or more second modules include a fallback determination module, the fallback determination module configured to:
determine an occurrence of an event warranting a fallback action; and
generate a fallback trajectory for causing the autonomous vehicle to perform a safety maneuver,
wherein the fallback determination module operates at the fourth operational frequency.

5. The system of claim 1, wherein the execution module is further configured to:
receive a fallback trajectory for causing the autonomous vehicle to perform a safety maneuver; and
execute the fallback trajectory to cause the autonomous vehicle to perform the safety maneuver.

6. The system of claim 1, wherein the fourth operational frequency is higher than the first operational frequency, the second operational frequency, and the third operational frequency.

7. The system of claim 1, wherein:
the third operational frequency is higher than the first operational frequency and the second operational frequency; and
the third operational frequency is lower than the fourth operational frequency.

8. The system of claim 1, wherein the first operational frequency is lower than the second operational frequency, the third operational frequency, and the fourth operational frequency.

9. A method implemented by a transportable computer system, the method comprising:
determining a current location of the transportable computer system;
determining a target location for the transportable computer system;
receiving, from one or more sensors associated with the transportable computer system, real-time processed sensor data;
determining, at a first operational frequency, a route to guide the transportable computer system from the current location to the target location;
determining, at a second operational frequency, an instruction for guiding the transportable computer system along at least a portion of the route based at least in part on the real-time processed sensor data;
generating, at a third operational frequency, a trajectory based at least in part on the real-time processed sensor data and the instruction; and
executing, at a fourth operational frequency, the trajectory to cause the transportable computer system to travel along the route.

10. The method of claim 9, wherein:
the determining the route is performed by a first computer system associated with the transportable computer system;
the determining the instruction for guiding the transportable computer system along at least the portion of the route is performed by the first computer system; and
the generating the trajectory is performed by the first computer system.

11. The method of claim 10, wherein the executing the trajectory to cause the transportable computer system to travel along the route is performed by a second computer system associated with the transportable computer system, the second computer system being different than the first computer system.

12. The method of claim 9, wherein the instruction comprises a policy and generating the trajectory based at least in part on the real-time processed sensor data comprises generating the trajectory based on the policy.

13. The method of claim 9, further comprising:
generating, at the second operational frequency, a fallback instruction for causing the transportable computer system to perform a fallback action;
generating, at the third operational frequency, a fallback trajectory based on the fallback instruction; and
outputting the fallback trajectory with the trajectory at a substantially same time.

14. The method of claim 9, further comprising:
determining an occurrence of an event warranting a fallback action;

generating, at the fourth operational frequency, a fallback trajectory for causing the transportable computer system to perform the fallback action; and executing the fallback trajectory to cause the transportable computer system to perform the fallback action.

15. A system comprising:

one or more processors; and one or more computer readable storage media communicatively coupled to the one or more processors and storing one or more modules including instructions that are executable by the one or more processors, the one or more first modules comprising:

- a route planning module configured to generate a route between a current location of the system and a target location of the system, the route planning module operating at a first operational frequency;
- a decision module configured to generate an instruction based on the route, the instruction including a sequence of actions to guide the system along the route, the decision module operating at a second operational frequency;
- a trajectory module configured to:
  - access real-time processed sensor data; and
  - generate an output trajectory based at least in part on the instruction and the real-time processed sensor data, the trajectory module operating at a third operational frequency; and
- an execution module configured to generate one or more signals for causing the system to move along the output trajectory, the execution module operating at a fourth operational frequency.

16. The system of claim 15, wherein the route planning module, the decision module, and the trajectory module are associated with a first computer system of the system and the execution module is associated with a second computer system of the system that is separate from the first computer system.

17. The system of claim 16, the one or more modules further comprising a fallback determination module associated with the second computer system, the fallback determination module configured to:

determine an occurrence of an event warranting a fallback action;

access a fallback trajectory for causing the system to perform the fallback action; and cause the fallback trajectory to be executed to cause the system to perform the fallback action.

18. The system of claim 17, wherein the event comprises:

an object is within a threshold distance of the system;

an object is predicted to be within a threshold distance of the system;

an absence of communication between the first computer system and the second computer system;

a confusion level associated with the system is above a confusion threshold;

a failure associated with a sensor of the system;

a malfunction of a component associated with the system;

a change in an occupancy status associated with the system;

a change in a status of a drivable surface associated with the trajectory; or a probability of a collision exceeds a threshold probability.

19. The system of claim 15, wherein:

the first operational frequency is less than the second operational frequency;

the second operational frequency is less than the third operational frequency; and the third operational frequency is less than the fourth operational frequency.

20. The system of claim 15, wherein the decision module is further configured to:

access an executed trajectory;

compare the executed trajectory with the output trajectory;

generate feedback data based at least in part on comparing the executed trajectory and the output trajectory; and updating at one or more of a model or an algorithm based at least in part on the feedback data.

* * * * *

UNITED STATES PATENT AND TRADEMARK OFFICE
CERTIFICATE OF CORRECTION

PATENT NO. : 10,353,390 B2  
APPLICATION NO. : 15/632208  
DATED : July 16, 2019  
INVENTOR(S) : Gary Linscott et al.

Page 1 of 1

It is certified that error appears in the above-identified patent and that said Letters Patent is hereby corrected as shown below:

Column 29, Line 12, In Claim 15, change "or more first modules comprising:" to -- or more modules comprising --.

Column 30, Line 21, In Claim 18, change "the trajectory; or" to -- the output trajectory; or --.

Signed and Sealed this  
Fifth Day of November, 2019

Andrei Iancu  
*Director of the United States Patent and Trademark Office*